United States Patent
Tang et al.

(10) Patent No.: US 7,465,519 B2
(45) Date of Patent: Dec. 16, 2008

(54) LITHIUM-ION BATTERY INCORPORATING CARBON NANOSTRUCTURE MATERIALS

(75) Inventors: Zikang Tang, Hong Kong (CN); Ping Sheng, Hong Kong (CN); Qi Liang, Hong Kong (CN); Ning Wang, Hong Kong (CN); Che Ting Chan, Hong Kong (CN)

(73) Assignee: The HongKong University of Science and Technology, Clear Water Bay, Kowloon, Hong Kong (CN)

( * ) Notice: Subject to any disclaimer, the term of this patent is extended or adjusted under 35 U.S.C. 154(b) by 0 days.

(21) Appl. No.: 10/933,751

(22) Filed: Sep. 3, 2004

(65) Prior Publication Data

US 2006/0051674 A1 Mar. 9, 2006

(51) Int. Cl.
*H01M 4/58* (2006.01)
(52) U.S. Cl. ............ 429/231.8; 429/231.9; 429/231.95; 977/742; 977/750
(58) Field of Classification Search .................. 429/128
See application file for complete search history.

(56) References Cited

U.S. PATENT DOCUMENTS

| | | | | |
|---|---|---|---|---|
| 5,063,038 | A | 11/1991 | Kirker et al. | 423/328 |
| 6,280,697 | B1 | 8/2001 | Zhou et al. | 423/414 |
| 6,422,450 | B1 | 7/2002 | Zhou et al. | 219/121.85 |
| 6,514,395 | B2 | 2/2003 | Zhou et al. | 204/409 |
| 6,703,163 | B2 | 3/2004 | Ogura et al. | 429/218.1 |
| 6,709,471 | B2 | 3/2004 | Miyamoto | 29/623.1 |
| 7,071,406 | B2 * | 7/2006 | Smalley et al. | 136/252 |
| 2002/0006547 | A1 | 1/2002 | Miyamotoa | 429/188 |
| 2002/0009637 | A1 | 1/2002 | Murakami et al. | 429/213 |
| 2002/0061441 | A1 | 5/2002 | Ogura et al. | 429/218.1 |
| 2002/0148727 | A1 | 10/2002 | Zhou et al. | 204/409 |
| 2002/0182495 | A1 | 12/2002 | Oguea et al. | 429/218.1 |
| 2002/0182505 | A1 | 12/2002 | Yanagisawa et al. | 429/231.4 |
| 2003/0036000 | A1 | 2/2003 | Mori et al. | 429/231.95 |
| 2003/0044685 | A1 | 3/2003 | Yanagisawa et al. | 429/231.8 |
| 2003/0077515 | A1 | 4/2003 | Chen et al. | 429/231.8 |
| 2003/0099883 | A1 | 5/2003 | Ochoa et al. | 429/232 |
| 2004/0022981 | A1 * | 2/2004 | Hu et al. | 428/36.9 |

(Continued)

FOREIGN PATENT DOCUMENTS

EP 0942485 9/1999

(Continued)

OTHER PUBLICATIONS

First-principles study of Li-intercalated carbon nanotube ropes, Physical Review Letter, vol. 85, pp. 1706-1709, Zhao, Jijun.*

(Continued)

*Primary Examiner*—Patrick Ryan
*Assistant Examiner*—Cynthia Lee
(74) *Attorney, Agent, or Firm*—Heslin Rothenberg Farley, Mesiti P.C.

(57) ABSTRACT

A lithium ion battery is disclosed in which the negative electrode material comprises carbon nanostructures having no dimension greater than 2 μm. The battery has a high reversible capacity of the order of 400 mAh/g to 500 mAh/g which can be maintained over a long cycle-life (at least 30 cycles). The carbon nanostructures may be mixed with graphite to improve conductivity. The carbon nanostructues may be synthesized using an AFI template material followed by calcination.

10 Claims, 1 Drawing Sheet

U.S. PATENT DOCUMENTS

| | | | |
|---|---|---|---|
| 2004/0175621 A1* | 9/2004 | Iriyama et al. | 429/231.95 |
| 2004/0241532 A1* | 12/2004 | Kim | 429/44 |
| 2004/0253512 A1 | 12/2004 | Watanabe et al. | 429/210 |
| 2005/0051805 A1* | 3/2005 | Kim et al. | 257/222 |
| 2005/0074479 A1* | 4/2005 | Weber et al. | 424/423 |
| 2005/0089757 A1* | 4/2005 | Bannai et al. | 429/231.8 |

OTHER PUBLICATIONS

Dahn et al., "Mechanisms for Lithium Insertion in Carbonaceous Materials," Science, Oct. 27, 1995, vol. 270, No. 5236, pp. 590-593.

Che et al., "Carbon Nanotubule Membranes for Electrochemical Energy Storage and Production," Nature, vol. 393, May 28, 1998, pp. 346-349.

Gao et al., "Electrochemical Intercalation of Single-Walled Carbon Nanotubes with Lithium," Elsevier, Chemical Physics Letters 307, 1999, pp. 153-157.

Claye et al., "Solid-State Electrochemistry of the Li Single Wall Carbon Nanotube System," Journal of the Electrochemical Society, vol. 147, No. 8, 2000, pp. 2845-2852.

Leroux et al., "Electrochemical Insertion of Lithium in Catalytic Multi-Walled Carbon Nanotubes," Elsevier, Journal of Power Sources vol. 81-82, 1999, pp. 317-322.

Frackowiak et al., "Electrochemical Storage of Lithium Multiwalled Carbon Nanotubes," Carbon, vol. 37, 1999, pp. 61-69.

Tang, et al., pending U.S. Appl. No. 10/933,779, filed Sep. 3, 2004, entitled "Synthesis Of Carbon Nanostructures".

Iijima, Sumio, "Helical Microtubules of Graphitic Carbon," Nature, Nov. 7, 1991, vol. 354, pp. 56-58.

Kyotani et al., "Formation of Ultrafine Carbon Tubes by Using an Anodic Aluminum Oxide Film as Template," Chemistry of Materials, Aug. 1995, vol. 7, No. 8, pp. 1427-1428.

Kyotani et al., "Formation of Platinum Nanorods and Nanoparticles in Uniform Carbon Nanotubes Prepared by a Template Carbonization Method," Chemical Communications, 1997, pp. 701-702.

Tang et al, "Mono-sized Single-wall Carbon Nanotubes Formed in Channels of AlPO$_4$-5 Single Crystal," Applied Physics Letters, Oct. 19, 1998, vol. 73, No. 16, pp. 2287-2289.

"The Smallest Carbon Nanotube" and "Single-Walled 4A Carbon Nanotube Arrays," Nature, Nov. 2, 2000, vol. 408, pp. 50-51.

Tang et al., "Superconductivity in 4 Angstrom Single-Walled Carbon Nanotubes," Science, Jun. 29, 2001, vol. 292, pp. 2462-2465.

Sun, et al., Polarized Raman spectra of single-wall carbon nanotubes mono-dispersed in channels of ALPO405 single crystals, Solid State Communications 109, pp. 365-369, 1999.

Li, et al., Polarized Absorption Spectra of Single-Walled 4 A Carbon Nanotubes Aligned in Channels of an ALP04-5 Single Crystal, Physical Review Letters, vol. 87 (No. 12), pp. 27401-1-107401-4, Sep. 2001.

Li, et al., Structural study of the 0.4-nm singled-walled carbon nanotubes aligned in channels of AlP04-5 crystal, Carbon, vol. 40, pp. 917-921, 2002.

Hulman, et al., Raman spectroscopy of template grown single wall carbon nanotubes in zeolite crystals, J. Chem. Phys., vol. 119 (No. 6), pp. 3384-3390, 2003.

Li, et al., Synthesis of 4A single-walled carbon nanotubes in catalytic Si-substituted AlP04-5 molecular sieves, Appl. Phys. Ltrs., vol. 85 (No. 7), pp. 1253-1255, 2004.

J.M. Tarascon et al., "Issues and Challenges Facing Rechargeable Lithium Batteries", Nature, vol. 414, p. 359, 2001.

Tao Zheng, J.N. Reimers and J.R. Dahn, "The Effect of Turbostratic Disorder in Graphitic Carbon Hosts on the Intercalation of Lithium", Phys. Rev. B., vol. 51, pp. 734-741, 1995.

* cited by examiner

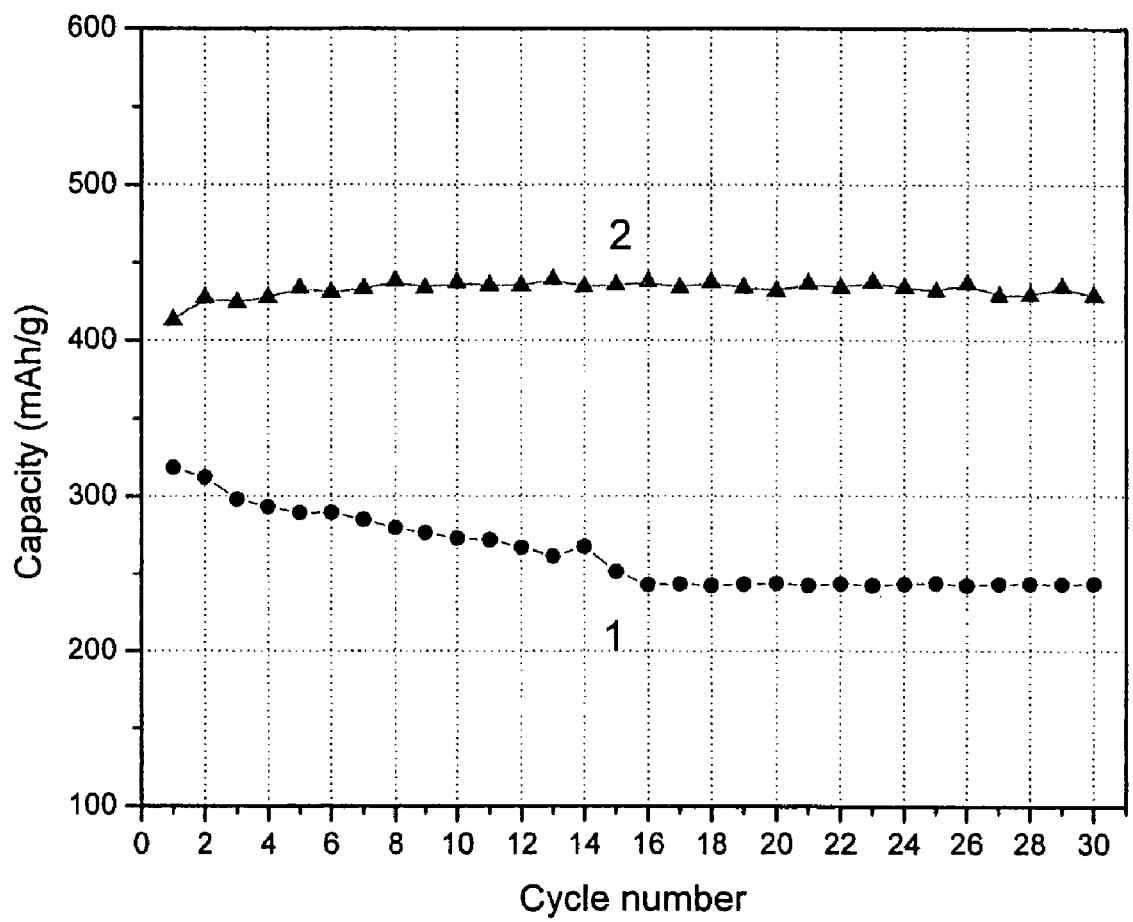

LITHIUM-ION BATTERY INCORPORATING CARBON NANOSTRUCTURE MATERIALS

CROSS-REFERENCE TO RELATED APPLICATION

This application is related to the following U.S. patent application:

U.S. patent application entitled "SYNTHESIS OF CARBON NANOSTRUCTURES" being filed concurrently herewith under (filed Sep. 3, 2004, and assigned Ser. No. 10/933,779), which is hereby incorporated by reference herein in its entirety.

FIELD OF THE INVENTION

This invention relates to a lithium-ion battery, and in particular to a lithium-ion battery incorporating carbon nanostructure materials as an electrode material with improved cycle life.

BACKGROUND OF THE INVENTION

Portable electronic devices such as laptop computers, cellular phones, portable electronics, small light-weight electrical equipment or future electric automobiles are becoming commonplace and very popular. An important aspect of their performance, however, is battery life and cycle life and this has driven a number of technological developments in secondary lithium-ion batteries, which are commonly be used in such device. A high energy density material is a crucial aspect to satisfy marketable demand for high-performance lithium-ion batteries which demand seeks a battery with several hours of use between charging cycles, and also with a long cycle life, that is to say the performance of the battery remains generally constant over multiple charging cycles.

As one of negative electrode materials of secondary lithium-ion batteries, lithium metal is a very attractive material due to its ultrahigh specific capacity, 3860 mAh/g. However unavoidable lithium dendrite caused by the lithium precipitates can bring out serious safety problems. After many investigations, in 1991, a lithium "rocking chair" battery was successfully commercialized with carbon as an electrode negative material. In addition to safety, the advantages of carbon are that it is inexpensive, non-toxic, with a relatively high specific capacity.

Currently, graphite is widely used for the negative electrode materials for commercially available secondary lithium-ion batteries. For graphite, typically the theoretical limit capacity is 372 mAh/g corresponding to $LiC_6$, depending however on its microstructure. See, for example, J. R. Dahn et al, *Mechanisms for Lithium Insertion in Carbonaceous Materials, Science*, Vol. 270, 590-593 1995. Such a specific capacity cannot, however, meet with the increasing requirements of much higher energy-density power supplies for modern-day electronics and possibly electric vehicles.

After the discovery of carbon nanotubes, people paid close attention to their electrochemical performance. See, for example, Guangli Che et al, *Carbon nanotube membranes for electrochemical energy storage and production, Nature*, Vol. 393, 346-349, 1998. As a kind of active material, the introduction of carbon nanotubes into the negative electrode of a secondary lithium battery is disclosed in U.S. Pat. Nos. 6,280,697, 6,709,471, 20030099883 as well as technical papers such as: Zhou et al, *Electrochemical intercalation of single-walled carbon nanotubes with lithium, Chem. Phys. Lett.* Vol. 307, 153-157, 1999; Agnes et al, *Solid-State Electrochemistry of the Li Single Wall Carbon Nanotube System, J. Electrochem. Soc.*, 147(8) 2845-2852 2000; E. Frackowaiak, et al Vol. 37 61-69, 1999 *Electrochemical storage of lithium multiwalled carbon nanotubes; Leroux F. J Power Sources* Vol. 81, 317-322 1999 *Electrochemical insertion of lithium in catalytic multi-walled carbon nanotubes*. However, although the carbon nanotubes showed a very high capacity for the first and second cycle when used as the negative electrode material for a secondary lithium-ion battery, the cycle-ability was very poor and thus to date there has been little in the way of practical applications for carbon nanotubes in commercial rechargeable lithium batteries.

An object of the present invention therefore is to provide a type of lithium-ion battery showing high capacity, high reversible efficiency, and much longer cycle life than commercially available graphite.

SUMMARY OF THE INVENTION

According to the present invention there is provided a lithium ion battery wherein the negative electrode material comprises carbon nanostructures having no dimension greater than 2 μm.

Viewed from another broad aspect the invention also extends to a lithium ion battery wherein the negative electrode material comprises carbon nanostructures that are synthesized by means of a method comprising the steps of comprising the steps of: (a) synthesising a microporous template material comprising crystals having no dimension greater than about 2 μm, (b) heating said crystals in the presence of an inert gas or a mixture of an inert gas and a carbon-containing gas at a temperature of between 500° C. and 900° C., and (c) recovering carbon nanostructures by washing the heated crystals in an acid to remove the template material.

Viewed from a still further broad aspect the invention also extends to a lithium ion battery comprising carbon nanostructures as a negative electrode material and having a reversible capacity in the range of 400 to 500 mAh/g.

BRIEF DESCRIPTION OF THE DRAWING

Some examples of the invention will now be described by way of example and with reference to the accompanying drawing, of a comparison of the specific discharge capacity and charge-discharge cycle number for a conventional battery using graphite (Curve 1) and for a battery formed in accordance with an embodiment of the invention (Curve 2).

DESCRIPTION OF THE PREFERRED EMBODIMENTS

Since the electrochemical lithium intercalation/de-intercalation properties of carbon materials greatly depend on their morphology, crystallinity, orientation of crystallites, and even defects, the capacity of a lithium ion battery can be enhanced by the choice of an appropriate nano-structured carbon material. An important aspect of the present invention, at least in its preferred forms, is that the carbon nanostructured material (which may be nano-sized graphite, nanofibres, isolated single walled carbon nanotubes, nano-balls, nano-sized amorphous carbon) comprises very small carbon nanostructures in which no dimension is greater than about 2 μm.

The carbon nanostructured materials may be formed using the synthesis method described in the aforementioned co-pending application filed on even date by the same inventors and entitled "Synthesis of Carbon Nanostructures" under (filed Sep. 3, 2004, and assigned Ser. No. 10/933,779), the contents of which are incorporated by reference. In summary, this related application discloses the synthesis of very small-sized carbon nanostructures (no dimension being greater than about 2 μm, typically 2 μm×2 μm×0.5 μm) using a correspondingly sized zeolite template material such as AFI (or preferably AFI with the incorporation of another element such as Si-AFI, Co-AFI, Cr-AFI or Ti-AFI). A carbon precursor material may be incorporated into the template material and the carbon nanostructures are formed by calcinations (at between 500° C. and 900° C.) under the protection of an inert gas, optionally a mixture of an inert gas and a carbon containing gas. After calcinations the material is cooled, subject to mechanical grinding and sieving, and then acid washing (eg in HCl) to remove the template material. The resulting carbon nanostructures may be amorphous, or they may be very short carbon nanotubes or other structures. For example analysis of a sample synthesized as described above with a high resolution transmission electron microscope found amorphous carbon nanoparticles (about 10 nm in diemnsion) and isolated single walled carbon nanotubes (diameter of 0.4 nm).

The following is an example of a technique for synthesizing carbon nanostructures suitable for use as an electrode material or as an additive for an electrical material:

EXAMPLE 1

Nanocarbons were fabricated using a 3% Si-AFI zeolite template material ($Si_{0.03}AlP_{0.97}$ with a feedstock recipe of $0.03(SiO_2):1(iso-Propanol)_3Al:0.97(H_3PO_4)$). 3% Si-AFI zeolite (2 μm×2 μm×0.5 μm) was loaded into a quartz vessel and then placed into a high-temperature reaction chamber. In a pre-heating step, the heating rate was controlled at 1° C. per minute from room temperature to 250° C. with an inert gas flow over the chamber at 400 ml/min. From 250-550° C., the heating rate could be increased to 5° C. per minute. At 550° C., 3% Si-AFI is calcined for 5 hours with a mixed gas of argon 200 ml/min and methane 300 ml/min. The as-obtained nanocarbons@zeolite was post-treated with HCl-washing for 48 hours, vacuum drying at 140° C. and a high-temperature treatment at 900° C. Nanocarbons were observed by HRTEM, and were seen to comprise more than 92% amorphouse nano-particles (about 10 nm) and less than 8% nanotubes.

In the following example of an embodiment of the invention, carbon nanostructured material was formed in accordance with the above described synthesis technique and was then washed with distilled water and dried in a vacuum oven before being used. All electrochemical measurements of present invention were carried out using coin type cells. The assembly of these cells was finished in an Ar-filled glove box. The electrolyte was 1 M $LiPF_6$ dissolved in a 50/50 (wt %) mixture of ethylene carbonate (EC) and diethyl carbonate (DEC). The copper foil acted as a current collector and support in the investigation.

EXAMPLE 2

In the figure, sample 1 is a conventional lithium ion battery in which graphite is used as the negative electrode material, while sample 2 is an embodiment of the present invention in which the negative electrode material is a mixture of a nano-carbon material as described above (50% by weight) mixed with graphite (50% by weight). In the measurement, nano-carbon and lithium foil were used as working electrode and counter electrode respectively. Constant current (80 mA/g) cycled charge/discharge was operated between 0.005 to 2.8 V (versus $Li/Li^+$) with PC control in room temperature. The measurement was carried out with a conventional two-electrode coin cell, wherein the working electrode comprises nanocarbon/graphite and the counter electrode was lithium metal. After soaking with an electrolyte, a Celgard polypropylene separator was sandwiched between the two electrodes. The electrolyte was 1 M $LiPF_6$ dissolved in a 50/50 (wt %) mixture of ethylene carbonate (EC) and diethyl carbonate (DEC).

Nanocarbons were mixed uniformly with graphite at 50/50 proportion by weight. Then the binder solution of polyvinylidene fluoride (PVDF, Aldrich) in 1-methyl-2-pyrrolidone (NMP, Aldrich) was added into the mixture of nanocarbons/graphite. The slurry of the mixture was coated on copper foil, the electrode film is about 30-40 microns thickness. After half-dry, the film was tailored to match the coin-cell mould. In the measurement, a constant current (80 mA/g) cycled charge/discharge was operated between 0.005 to 2.8 V (versus $Li/Li^+$) with PC control at room temperature.

It can be clearly seen that the reversible capacity of the conventional graphite sample 1 for the first 10 cycles is about 280-300 mAh/g. However, subsequently the capacity decays to about 250 mAh/g in the following cycles. For sample 2 with the introduction of the nano-carbon material, the capacity increases significantly to about 450 mAh/g (corresponding to $Li_{1.2}C_6$), which is about 1.5-1.8 times to that of graphite, and furthermore excellent cycle-ability is obtained for sample 2 at least over 30 charging cycles and even over 50 cycles (bearing in mind that the experimental data was obtained using a half-cell). In other words the incorporation of small-sized nano-carbon materials into the negative electrode material can enhance the specific capacity and cycle-ability simultaneously. This is very important for application in the commercial batteries.

The very small size of these nano-carbon materials is probably a crucial reason for above effect on reversible specific capacity. At the same time, the interconnection between nano-carbon and graphite is a feasible matrix for the intercalation/deintercalation of lithium ion with the introduction of nano-carbons.

In summary, the present invention provides a lithium-ion battery using a nano-structured carbon based material for the negative electrode with a reversible capacity of approximately 400-800 mAh/g. The nano-structured carbon is very small-sized (no dimension greater than about 2 μm) and may, for example, be synthesized by means of a template and chemical vapor deposition (CVD) technique. The carbon nano-structured material may be nano-sized graphite, nanofibres, isolated single walled carbon nanotubes, nano-balls or nano-sized amorphous carbon. The nano-structured carbon material may be treated before use such as by means of an acid wash, high-temperature anneal, hydrogen activation, mechanical milling and drying in vacuum.

The nano-structured carbon material may be used as an additive (for example to graphite) comprising about 10 wt %-90 wt % of the negative electrode material, though a 50:50 wt % ratio is particularly preferred as it is found to give good results. Alternatively the negative electrode may be fully composed of the said nano-structured negative electrode material with a plastic binder.

We claim:

1. A lithium ion battery wherein the negative electrode material comprises carbon nanotubes having no dimension greater than 2 μm, and wherein the negative electrode material comprises a mixture of said carbon nanotubes and graphite.

2. A battery as claimed in claim 1 wherein said carbon nanostructures comprise from 10 wt % to 90 wt % of said mixture.

3. A battery as claimed in claim 2 wherein said carbon nanostructures comprise 50 wt % of said mixture.

4. A battery as claimed in claim 1 wherein said negative electrode material comprises said carbon nanostructures and a binder.

5. A battery as claimed in claim 1 wherein the carbon nanostructures comprises a mixture of approximately 90% amorphous nanocarbon and 10% single-walled carbon nanotubes.

6. A lithium ion battery wherein a negative electrode material comprises carbon nanotubes having no dimension greater than 2 μm, and wherein said lithium ion battery comprises a reversible capacity in a range of 400 to 500 mAh/g, and wherein the negative electrode material comprises a mixture of said carbon nanotubes and graphite.

7. A battery as claimed in claim 6 wherein said carbon nanostructures comprise 50 wt % of said mixture.

8. A battery as claimed in claim 6 wherein said negative electrode material comprises said carbon nanostructures and a binder.

9. A battery as claimed in claim 6 wherein the carbon nanostructures comprises a mixture of approximately 90% amorphous nanocarbon and 10% single-walled carbon nanotubes.

10. A battery as claimed in claim 6 wherein the reversible capacity remains unaltered over at least 30 charging cycles.

* * * * *